Dec. 18, 1923.  
R. H. PRICHARD  
1,478,251  
LUGGAGE CARRIER FOR AUTOMOBILES  
Filed May 9, 1921

INVENTOR.  
Robert H. Prichard,  
BY  
ATTORNEYS.

Patented Dec. 18, 1923.

1,478,251

UNITED STATES PATENT OFFICE.

ROBERT H. PRICHARD, OF LOS ANGELES, CALIFORNIA.

LUGGAGE CARRIER FOR AUTOMOBILES.

Application filed May 9, 1921. Serial No. 467,944.

*To all whom it may concern:*

Be it known that I, ROBERT H. PRICHARD, a citizen of the United States, and a resident of Los Angeles, in the county of Los Angeles, State of California, have invented new and useful Improvements in Luggage Carriers for Automobiles, of which the following is a specification.

This invention relates to luggage carriers and the main object of this invention is to provide at the ends of the carrier disclosed in the said patent hinged sections adapted to fold inwardly against the side of the device when not in use and to extend inwardly of and transversely across the running board of an automobile for enclosing the portion of the said running board intermediate the ends of the carrier. In this manner the space within the limits of the carrier on the running board may be utilized for holding suit cases, hand bags, packages and other articles so that the same will not be displaced during the movement of the vehicle and additionally provides a convenient method of carrying articles in a place readily accessible for use at any time.

Another object is to provide in a luggage carrier having an extensible side structure adapted to be compactly folded together when not in use and to be extended and attached to the running board of a vehicle for use, a pair of end members of skeleton form hingedly attached to the supporting standards of said side structure and foldable thereagainst and capable of being extended and held in transverse planes across the running board for use, said end members being movable when the carrier is attached to the running board of the vehicle. Other objects may appear as the description of my invention progresses.

I have illustrated a preferred form of device in the accompanying drawing of my invention forming a part of this application, in which.

The form of device shown in said drawings includes a pair of channeled end standards S, S and a similar intermediate standard S' having U-shaped members C, C, C rigidly attached thereto at their lower ends. The legs 1 and 2 of said members being extended horizontally and the legs 2 thereof having screw clamps C' supported thereon.

Figure 1:
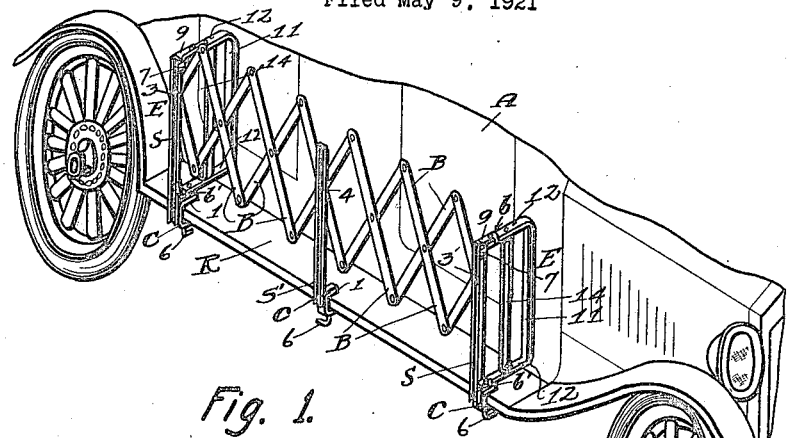
Fig. 1 is a perspective view of a portion of an automobile showing my luggage carrier attached thereto for use.
Figure 2:
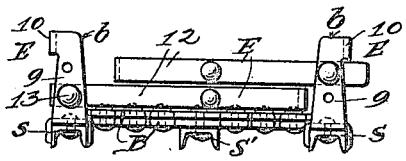
Fig. 2 is a plan view of the same folded together.
Figure 3:
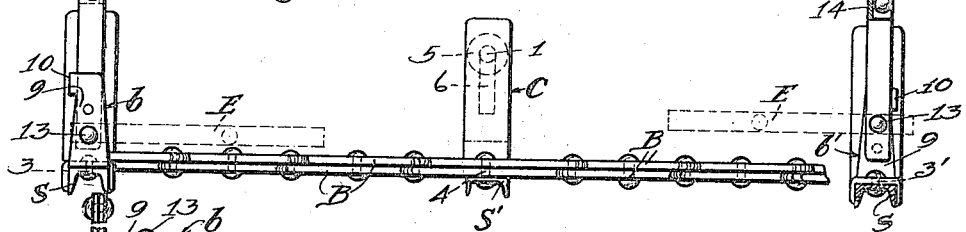
Fig. 3 is a plan view of the device detached from the automobile and extended.
Figure 4:
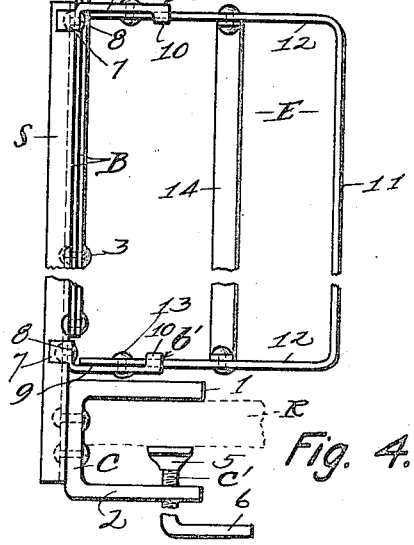
Fig. 4 is an enlarged end elevation of the same.

The side of the carrier is formed by a plurality of diagonal bars B, B, etc., of opposite inclination and hinged together at their ends and at the central intersections in the manner shown in Fig. 1, said side portion being arranged after the fashion of lazy tongs. The side bars B are attached at 3, and 3' to the end standards S, S and at 4 to the central standard S'.

The carrier is attached to the running board R of the automobile A by means of the clamps C and screws C' on the lower ends of the standards, the upper legs 1 of the members C being held in contact with the upper surface of the running board and the swivel collars 5 on the ends of the screws C' being forced into engagement with the lower surface of said running board by turning the handles 6 of said screws.

It will be apparent that in this form of carrier the length may be regulated to suit the desire of the user by extending the side of the carrier prior to the attachment of the carrier to the running board, and the entire space between the outer edge of the running board and the side of the body may be utilized for holding articles during the movement of the vehicle. All of the features hereinbefore enumerated and described are immaterial to my present invention but serve to give an idea of the utility of my improvements which consist in the provision on the structure described of the hinged end sections E, E, which I will describe in detail.

In order to carry out the objects of my invention and to add my improvements to the structure of the carrier in a convenient and practical manner I provide on each of the end standards S, S a pair of brackets *b* and *b'* which are spaced apart vertically of said standards and have downwardly and upwardly bent portions 7, respectively attached to the flat inner sides of the standards by means of rivets 8, or otherwise. Said members also have right angularly bent portions 9 which extend inwardly from said standards and have lugs 10 formed thereon which are formed at right angles to the portions 9.

The ends E, E of the carrier consist of main members having vertical portions 11 with horizontal legs 12, 12 formed thereon and pivotally attached to the brackets b and b' on the standards S, S by means of rivets or bolts 13, and also other vertical members 14 attached at their ends to the portions 12, 12 for closing partially the space between the vertical portions 11 and the standards. The pivots 13, 13, of the ends E, E, are placed at unequal distances from the lazy tong structure of the body B, respectively, so that said ends may be folded parallel with the body and at different planes, in order that the carrier may be collapsed into a minimum space without straining.

End members E are adapted to swing inwardly against the sides of the carrier on the rivets 13 when not in use and to be extended at right angles thereto when in position for use, and the arrangement is such that the ends may be moved when the carrier is attached to the running board. When in position for use on the running board said end members are held in engagement with the lugs 10 of the brackets b and b' so as to prevent their movement outwardly from the standard in order that articles held in the space enclosed by the carrier may not be displaced from position.

It will be understood that the end members E, E, when folded inwardly against the members B, forming the side of the carrier will adapt the carrier to all uses and purposes for which it could not be employed without the members E, E, while at the same time providing ends for the space between the side of the carrier and the body of the automobile, when only a restricted space is desired.

The carrier thus provided is light, compact and conveniently arranged for ready attachment to the vehicle running board, and though I have shown the ends E of skeleton form, the same may be otherwise made and attached to the side of a carrier of the same or different form from that shown, without departing from the spirit of my invention or enlarging the scope thereof beyond the appended claims.

What I claim is:

1. A luggage carrier having standards detachably held on a vehicle and provided with members extending inwardly thereof and spaced apart, and end members hingedly attached to said extended members at points inwardly of the standards and above the running board of a vehicle whereby the ends may be folded inwardly against the side of the carrier when not in use and outwardly therefrom and at right angles thereto when in position for use, as described.

2. A luggage carrier having spaced standards detachably held on the running board of a vehicle, brackets on the inner sides of said standards having lugs formed thereon disposed at right angles to the running board, end members hingedly attached to said brackets at points spaced from the side of said carrier and adapted to be held in transverse positions by means of said lugs, said ends being movable when the carrier is in position for use.

3. A luggage carrier comprising an extensible side portion having a plurality of spaced standards adapted to be detachably held on the running board of a vehicle, right angularly disposed extensions on said standards transversely of said running board, foldable end members supported on said extensions and capable of being swung about an axis on an arc of substantially ninety degrees when the carrier is in position for use, means for limiting the outward movement of said end members relative to said side portion.

4. In a luggage carrier of the character described, the combination with a running board of a vehicle, of extensions on said carrier above said running board, end members hingedly attached to said extensions and adjustable about an arc of substantially ninety degrees for moving said members into and from positions of use when the carrier is attached to said running board, and means for limiting the outward movement of said end members.

ROBERT H. PRICHARD.

Witnesses:
LUTHER L. MACK,
H. G. MOORE.